(12) United States Patent
Agrawal et al.

(10) Patent No.: US 8,607,350 B2
(45) Date of Patent: Dec. 10, 2013

(54) SOVEREIGN INFORMATION SHARING SERVICE

(75) Inventors: Rakesh Agrawal, San Jose, CA (US); Dmitri Asonov, Moscow (RU); Murat Kantarcioglu, Richardson, TX (US); Yaping Li, Berkeley, CA (US)

(73) Assignee: International Business Machines Corporation, Armonk, NY (US)

( * ) Notice: Subject to any disclaimer, the term of this patent is extended or adjusted under 35 U.S.C. 154(b) by 2036 days.

(21) Appl. No.: 11/393,356

(22) Filed: Mar. 30, 2006

(65) Prior Publication Data
US 2007/0240224 A1 Oct. 11, 2007

(51) Int. Cl.
*H04L 29/06* (2006.01)

(52) U.S. Cl.
USPC .............. 726/25; 726/26; 713/172; 713/190

(58) Field of Classification Search
USPC .................. 726/25, 26; 713/172, 190
See application file for complete search history.

(56) References Cited

U.S. PATENT DOCUMENTS

| | | | | |
|---|---|---|---|---|
| 4,908,038 | A * | 3/1990 | Matsumura et al. | 235/380 |
| 5,930,785 | A * | 7/1999 | Lohman et al. | 1/1 |
| 5,987,440 | A | 11/1999 | O'Neil et al. | |
| 6,366,905 | B1 * | 4/2002 | Netz | 707/600 |
| 6,581,057 | B1 * | 6/2003 | Witbrock et al. | 1/1 |
| 6,745,180 | B2 * | 6/2004 | Yamanoue | 707/734 |
| 7,047,230 | B2 * | 5/2006 | Gibbons | 707/600 |
| 7,293,037 | B2 * | 11/2007 | Chaudhuri et al. | 707/603 |
| 7,328,343 | B2 * | 2/2008 | Caronni | 713/171 |
| 7,363,301 | B2 * | 4/2008 | Chaudhuri et al. | 1/1 |
| 7,370,068 | B1 * | 5/2008 | Pham et al. | 1/1 |
| 7,454,016 | B2 * | 11/2008 | Tsunoo | 380/29 |
| 7,493,316 | B2 * | 2/2009 | Chaudhuri et al. | 1/1 |
| 7,500,111 | B2 * | 3/2009 | Hacigumus et al. | 713/193 |
| 7,577,667 | B2 * | 8/2009 | Hinshaw et al. | 1/1 |
| 7,685,437 | B2 * | 3/2010 | Hacigumus et al. | 713/193 |
| 7,783,900 | B2 * | 8/2010 | Hacigumus et al. | 713/193 |
| 7,797,342 | B2 * | 9/2010 | Banks et al. | 707/783 |
| 7,953,723 | B1 * | 5/2011 | Dutton et al. | 707/707 |
| 8,386,469 | B2 * | 2/2013 | Reuther et al. | 707/715 |
| 2002/0040439 | A1 | 4/2002 | Kellum | |
| 2002/0103806 | A1 * | 8/2002 | Yamanoue | 707/100 |
| 2002/0123979 | A1 * | 9/2002 | Chaudhuri et al. | 707/1 |
| 2002/0124001 | A1 * | 9/2002 | Chaudhuri et al. | 707/100 |
| 2004/0062391 | A1 * | 4/2004 | Tsunoo | 380/42 |
| 2004/0073788 | A1 * | 4/2004 | Kim et al. | 713/160 |

(Continued)

OTHER PUBLICATIONS

Agrawal et al., Enabling Sovereign Information Sharing Using Web Services, 2004, IBM.*

(Continued)

*Primary Examiner* — David Garcia Cervetti
(74) *Attorney, Agent, or Firm* — Gibb & Riley, LLC

(57) ABSTRACT

Embodiments herein provide a method, system, etc. for a sovereign information sharing service. More specifically, a method for secure distributed query processing comprises storing data tables from at least one data provider in at least one first computer comprising a sovereign server. Next, encrypted input and output of the data tables is performed between the server and a second computer. Following this, join operations are computed, comprising determining whether arbitrary join predicates yield matches within the data tables; and encrypted results of the join operations are output. The method minimizes possible information leakage from interaction between the server and the second computer by making observations and inferences from patterns of the outputting of the encrypted results.

17 Claims, 3 Drawing Sheets

(56) References Cited

U.S. PATENT DOCUMENTS

| | | | | |
|---|---|---|---|---|
| 2004/0236735 | A1* | 11/2004 | Chaudhuri et al. | 707/3 |
| 2004/0243799 | A1* | 12/2004 | Hacigumus et al. | 713/150 |
| 2004/0250100 | A1 | 12/2004 | Agrawal et al. | |
| 2005/0021488 | A1 | 1/2005 | Agrawal et al. | |
| 2005/0204128 | A1 | 9/2005 | Aday et al. | |
| 2006/0036600 | A1* | 2/2006 | Chaudhuri et al. | 707/7 |
| 2006/0294362 | A1* | 12/2006 | Epstein | 713/153 |
| 2007/0237326 | A1* | 10/2007 | Nonaka et al. | 380/37 |
| 2008/0033960 | A1* | 2/2008 | Banks et al. | 707/9 |

OTHER PUBLICATIONS

Agrawal et al., Information Sharing Across Private Databases, 2003, IBM.*

N. Abe, C. Apte, B. Bhattacharjee, K. Goldman, J. Langford, and B. Zadrozny. Sampling approach to resource light data mining. In SIAM Workshop on Data Mining in Resource Constrained Environments, 2004.

R. Agrawal, D. Asonov, P. Baliga, L. Liang, B. Prost, and R. Srikant. A reusable platform for building sovereign information sharing applications. In 1st Workshop on Databases in Virtual Organizations, Jun. 2004.

R. Agrawal, A. Evfimievski, and R. Srikant. Information sharing across private databases. In Proc. of the 2003 ACM SIGMOD Int'l Conf. on Management of Data, San Diego, CA, Jun. 2003.

J. P. Anderson. Computer security technology planning study. Technical Report ESD-TR-73-51, vol. II, HQ Electronic Systems Division (AFSC), L.G. Hanscom Field, Bedford, MA, Oct. 1972.

D. Asonov. Querying Databases Privately. PhD thesis, Springer Verlag, Jun. 2004.

K. E. Batcher. Sorting networks and their applications. In Proc. of AFIPS Spring Joint Comput. Conference, vol. 32, 1968.

K. C. Chang and S. Hwang. Minimal probing: Supporting expensive predicates for top-k queries. In Proc. of the 2002 ACM SIGMOD Int'l Conf. on Management of Data, Madison, Wisconsin, Jun. 2002.

C. Clifton, M. Kantarcioglu, X. Lin, J. Vaidya, and M. Zhu. Tools for privacy preserving distributed data mining. SIGKDD Explorations, 4(2):28-34, Jan. 2003.

D. J. DeWitt and R. Gerber. Multiprocessor hash-based join algorithms. In Proc. of the 11th Conference on Very Large Databases, Stockholm, 1985.

M. J. Freedman, K. Nissim, and B. Pinkas. Efficient private matching and set intersection. In Proc. Advances in Cryptology—EUROCRYPT 2004, Interlaken, Switzerland, May 2004.

V. Gligor and P. Donescu. Fast encryption and authentication: XCBC encryption and XECB authentication modes, 2000.

K. Goldman and E. Valdez. Matchbox: Secure data sharing. IEEE Internet Computing, 8(6):18-24, 2004.

O. Goldreich. Foundations of Cryptography, vol. 2: Basic Applications. Cambridge University Press, May 2004.

O. Goldreich and R. Ostrovsky. Software protection and simulation on oblivious RAMs. J. ACM, 43(3):431-473, May 1996.

P. Gutmann. An open-source cryptographic coprocessor. In USENIX, 2000.

B. A. Huberman, M. Franklin, and T. Hogg. Enhancing privacy and trust in electronic communities. In Proc. of the 1st ACM Conference on Electronic Commerce, pp. 78-86, Denver, Colorado, Nov. 1999.

IBM Corporation. IBM 4758 Models 2 and 23 PCI cryptographic coprocessor, 2004.

C. S. Jutta. Encryption modes with almost free message integrity. Lecture Notes in Computer Science, 2045:529-544, 2001.

M. Kitsuregawa, H. Tanaka, and T. Moto-Oka. Application of hash to data base machine and its architecture. New Generation Computing, 1(1), Mar. 1983.

T. Kontzer. Airlines and hotels face customer concerns arising from anti-terrorism efforts. Information Week, Mar. 2004.

D. Malkhi, N. Nisan, B. Pinkas, and Y. Sella. Fairplay—a secure two-party computation system. In Usenix Security '2004, Aug. 2004.

B. Pinkas. Fair secure two-party computation. In Advances in Cryptology—EUROCRYPT'2003, vol. 2656 of Lecture Notes in Computer Science, pp. 87-105. Springer-Verlag, May 2003.

P. Rogaway, M. Bellare, and J. Black. OCB: A blockcipher mode of operation for efficient authenticated encryption. ACM Transactions on Information and System Security, 6(3):365-403, Aug. 2003.

B. Schneier. Applied Cryptography. John Wiley, second edition, 1996.

S. W. Smith. Secure coprocessing applications and research issues. Los Alamos Unclassified Release RLA-UR-96-2805, Los Alamos National Laboratory, Los Alamos, NM, Aug. 1996.

S.W. Smith and D. Safford. Practical server privacy with secure coprocessors. IBM Systems Journal, 40(3), Sep. 2001.

Trusted Computing Group. TCG specification architecture overview, 2004.

WetStone Technologies. TIMEMARK timestamp server, 2003.

A. C. Yao. How to generate and exchange secrets. In Proc. of the 27th Annual Symposium on Foundations of Computer Science, pp. 162-167, Toronto, Canada, Oct. 1986.

B. S. Yee. Using Secure Coprocessors. PhD thesis, Carnegie Mellon Univeristy, May 1994.

B. S. Yee and J. D. Tygar. Secure coprocessor in electronic commerce applications. In the First USENIX Workshop on Electronic Commerce, Jul. 1995.

S. Smith and S.Weingart. Building a high-performance, programmable secure coprocessor. Research Report RC 21102, IBM T.J. Watson Research Center, Yorktown Heights, New York, Feb. 1998.

A. Iliev and S. Smith. Privacy-enhanced credential services. In 2nd Annual PKI Resarch Workshop, NIST, Gaithersburg, Apr. 2003.

R. Agrawal, D. Asonov, R. Srikant, Enabling Sovereign Information Sharing Using Web Services, SIGMOD 2004, Jun. 13-18, 2004, pp. 1-5.

C. S. Jutla. Encryption modes with almost free message integrity. Lecture Notes in Computer Science, 2045:529-544, 2001.

B. Pinkas. Fair secure two-party computation. In Advances in Cryptology—EUROCRYPT'2003, vol. 2656 of Notes in Computer Science, pp. 87-105. Springer-Verlag, May 2003.

B. S. Yee and J. D. Tygar. Secure coprocessors in electronic commerce applications. In the First USENIX Workshop on Electronic Commerce, Jul. 1995.

* cited by examiner

SOVEREIGN INFORMATION SHARING SERVICE

BACKGROUND

1. Field of the Invention

Embodiments herein provide a method, system, etc. for a sovereign information sharing service.

2. Description of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Conventional information integration approaches, as exemplified by centralized data warehouses and mediator-based data federations, assume that the data in each database can be revealed completely to the other databases. Consequently, information sharing across autonomous entities is inhibited due to confidentiality and privacy concerns. The goal of sovereign information sharing [2, 3, 8] is to enable such sharing by allowing queries to be computed across sovereign databases such that nothing apart from the result is revealed. The computation of join of sovereign databases in such a manner is referred to as sovereign join. Two motivating applications of sovereign joins are cited below [3].

First, for national security, it might be necessary to check if any of the airline passengers is on the watch list of a federal agency [21]. Sovereign join may be used to find only those passengers who are on the list, without obtaining information about all the passengers from the airline or revealing the watch list.

Second, in epidemiological research, it might be of interest to ascertain whether there is a correlation between a reaction to a drug and some DNA sequence, which may require joining DNA information from a gene bank with patient records from various hospitals. However, a hospital disclosing patient information could be in violation of privacy protection laws, and it may be desirable to access only the matching sequences from the gene bank.

A system offering sovereign join services has the following desirable attributes. First, the system should be able to handle general joins involving arbitrary predicates. The national security application cited above requires a fuzzy match on profiles. Similarly, the patient records spread across hospitals may require complex matching in the healthcare application.

Second, the system should be able to handle multi-party joins. The recipient of the join result can be a party different from one of the data providers.

Next, the recipient should only be able to learn the result of the join computation. No other party should be able to learn the result values or the data values in someone else's input. Lastly, the system should be provably secure. The trusted component should be small, simple, and isolated [4].

A secure network service is provided for sovereign information sharing who's only trusted component is a secure coprocessor [15, 26, 32]. The technical challenge in implementing such a service arises from the following. First, secure coprocessors have limited capabilities. They rely on the server to which they are attached for disk storage or communication with other machines. They also have small memory. Second, while the internal state of a computation within the secure coprocessor cannot be seen from outside, the interactions between the server and the secure coprocessor can be observed.

Simply encrypting communication between the data providers and the secure processor is, therefore, insufficient. The join computation needs to be carefully orchestrated such that the read and write accesses made by the secure coprocessor cannot be exploited to make unwanted inferences.

Careful orchestration of join computation in the face of limited memory has been a staple of database research for a long time. The goal in the past, however, has been the minimization of input/output (I/O) to maximize performance. While the I/O minimization is still important, avoiding leakage through patterns in I/O accesses now becomes paramount.

In principle, sovereign information sharing can be implemented by using techniques for secure function evaluation (SFE) [13, 31]. Given two parties with inputs x and y respectively, SFE computes a function $f(x, y)$ such that the parties learn only the result. SFE techniques are considered to have mostly theoretic significance and have been rarely applied in practice, although some effort is afoot to change the situation [22].

To avoid the high cost of SFE one approach taken in [3] was to develop specialized protocols for intersection, intersection size, equijoin, and equijoin in size. Similar protocols for intersection have been proposed in [8, 16]. A new intersection protocol has been recently proposed in [10]. However, the protocols provided in [3] have the following shortcomings. First, it is not clear how to extend them to operations involving general predicates as they are hash-based. Second, they leak information. For example, the equijoin size protocol leaks the distribution of duplicates; if no two values have the same number of duplicates, it can also leak the intersection.

Secure coprocessors have been earlier used in a variety of applications, including secure e-commerce [33], auditable digital time stamping [30], secure fine-grained access control [12], secure data mining [1], and private information retrieval [5, 28]. A taxonomy of secure coprocessing applications has been provided in [27]. The techniques developed therein though are quite different. Note that the capabilities provided in the architectures such as Trusted Computing Group's trusted platform module [29], while complementary, do not solve the problem.

SUMMARY

Embodiments of the invention present a secure network service for sovereign information sharing who's only trusted component is an off-the-shelf secure coprocessor: The participating data providers send encrypted relations to the service that sends the encrypted results to the recipients. The technical challenge in implementing such a service arises from the limited capability of the secure coprocessors. While they are tamper-proof, they have small memory, no attached disk, and no facility for communicating directly with other machines in the network. The internal state of an ongoing computation within the secure coprocessor cannot be seen from outside, but its interactions with the server can be exploited by an adversary.

The problem of computing join is formulated in this setting where the goal is to prevent information leakage through patterns in I/O while maximizing performance. A criterion is specified for proving the security of a join method and for providing provably safe methods. These methods can be used to compute general joins involving arbitrary predicates and multiple sovereign databases. Thus a new class of applications is enabled requiring query processing across autonomous entities such that nothing apart from the result is revealed to the recipients.

Thus, embodiments herein provide a method, system, etc. for a sovereign information sharing service. More specifically, a method for secure distributed query processing comprises storing data tables from at least one data provider in at least one first computer comprising a sovereign server. Next, encrypted input and output of the data tables is performed between the server and a second computer. Following this, join operations are computed, comprising determining whether arbitrary join predicates yield matches within the data tables; and encrypted results of the join operations are output. The method minimizes possible information leakage from interaction between the server and the second computer by making observations and inferences from patterns of the outputting of the encrypted results.

Furthermore, the outputting of the encrypted results comprises outputting a size of the results and a processing time that are independent of whether the arbitrary join predicates yield the matches. Specifically, this comprises outputting decoys and performing additional CPU cycles to increase the processing time.

Thus, a method is provided for secure distributed query processing, comprising performing encrypted input and output of data tables between a server and a secure computer, and performing queries of the data tables to produce results. The method modifies the results by at least one of increasing a size of the results, comprising adding decoys to the results; increasing a processing time of the results, comprising performing additional CPU cycles; and, encrypting the results to produce modified results. The modifying of the results is independent of whether data matches corresponding to the queries exist within the data tables. Following this, the method outputs the modified results.

Embodiments herein further provide a system for secure distributed query processing, comprising at least one first computer, comprising a sovereign server adapted to store data tables from at least one data provider, and a second computer operatively connected to the first computer. The second computer is adapted to perform encrypted input and output of the data tables with the first computer, compute join operations to determine whether arbitrary join predicates yield matches within the data tables, and output encrypted results of the join operations. Moreover, the second computer is adapted to output a fixed size of the encrypted results during a fixed processing time.

The fixed size of the encrypted results during the fixed processing time is adapted to minimize information leakage from interaction between the first computer and the second computer, wherein the information leakage comprises observations and inferences from patterns of the encrypted results. Further, the fixed size of the encrypted results and the fixed processing time are independent of whether the arbitrary join predicates yield the matches. Specifically, the fixed size of the encrypted results comprises decoys and the fixed processing time comprises additional CPU cycles.

Thus, a system for secure distributed query processing is provided comprising a secure computer adapted to perform encrypted input and output of data tables with a server, perform queries of the data tables to produce results, modify the results to produce modified results, and output the modified results. The modified results comprise a fixed size and/or a fixed processing time, wherein the modified results are independent of whether data matches corresponding to the queries exist within the data tables. Specifically, the modified results comprise decoys and/or additional CPU cycles.

Accordingly, a secure information sharing service is presented offering sovereign joins, built using off-the-shelf secure coprocessors. The design can do general joins involving arbitrary predicates across any number of sovereign databases; nothing apart from the result is revealed to the recipients; the only trusted component is the secure coprocessor; and the system is provably secure.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
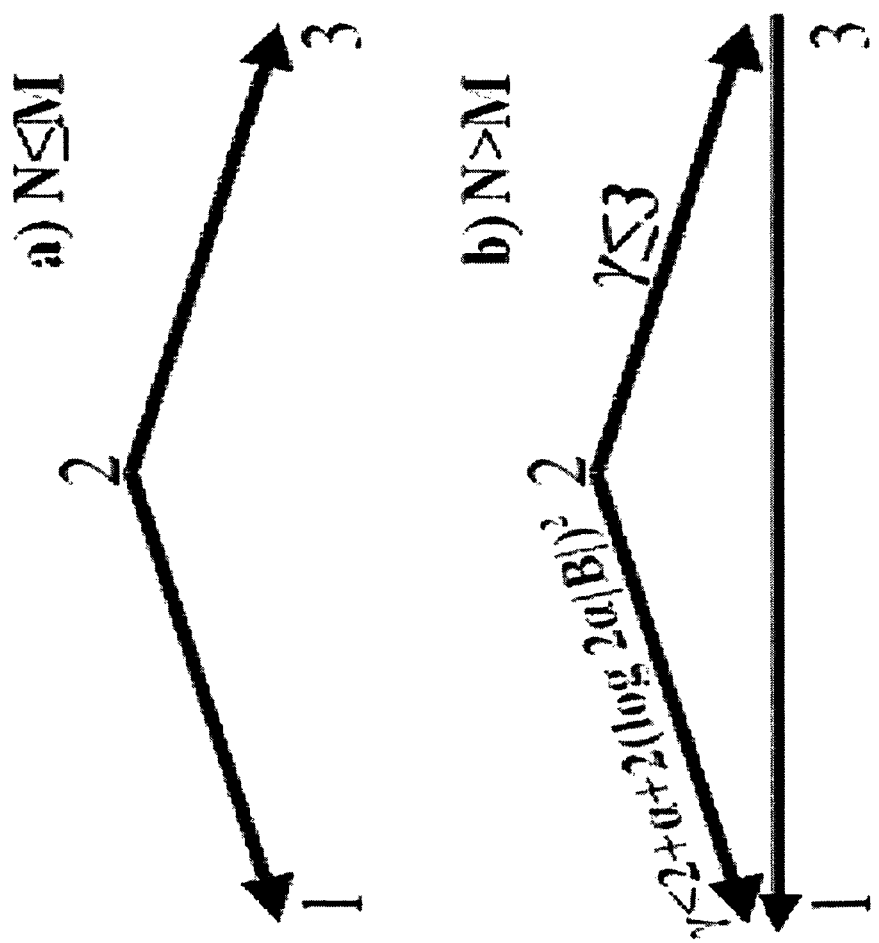
FIG. 1 is a diagram illustrating the performance relationship between three methods.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Embodiments of the invention specify the adversarial model and give the simplifying assumptions and notations. Some of the subtleties of the problem are illustrated using nested loop. This investigation enables the distillation of the design principles underlying the methods. Also, the correctness criterion is defined for proving the safety of the join methods.

Two provably safe methods are provided for general join in which the matching predicate can be an arbitrary function. They offer a range of performance trade-offs under different operating parameters.

The study of equijoins is also provided. Adaptations of sort-merge join or hash join turn out to be unsafe. A safe method is then provided. The performance characteristics of the methods are analyzed.

The following specifies the adversarial model and the simplifying assumptions and notations. The computing model admits any number of data providers and result recipients.

Without loss of generality, the case is considered where two parties $P_A$ and $P_B$ that have private relations A and B are participating in the sovereign join operation and the result C is sent to the party $P_C$. It is assumed that the join method and the join predicates are known to the parties.

The server S, offering sovereign information sharing, is a general purpose computer. A secure coprocessor T is attached to S. The only trusted component is the secure coprocessor. All other components, including S, are un-trusted. No party (including S) can observe the state of the computation inside T or tamper with the code loaded into it.

Communication between T and $P_A$, $P_B$, or $P_C$ is encrypted. Similarly, any temporary value output by T to S is also encrypted.

Given that nothing but T is trusted, the challenge of validating the authenticity and protecting the secrecy of the computation done by T is provided.

The remote attestation mechanism provided by the secure coprocessor is used to ensure that it is indeed executing a known, trusted version of the application code, running under a known, trusted version of the OS, and loaded by a known, trusted version of the bootstrap code [12].

It is assumed that $P_A$ and $P_B$ have signed a digital contract [12] prescribing what data can be shared and which computations are permissible. T holds a copy of the contract and serves as an arbiter of it. Contracts are kept encrypted at the server. At the start of a join computation, T authenticates the identities of $P_A$ and $P_B$ to ensure that the parties it is interacting with are indeed the ones listed in the contract. Then T sets up the symmetric keys to be used with $P_A$ and $P_B$ respectively. Each party prepends its relation with the contract ID and encrypts the two together as one message.

An encryption scheme is required that provides both message privacy and message authenticity. Such schemes are called authenticated encryption and include XCBC, IAPM, and OCB [11, 19, 24]. OCB (which stands for "offset codebook") is chosen over the other two, as it requires the least number of block cipher operations (m+2 block cipher operations to encrypt (resp. decrypt) m plaintext (resp. ciphertext) blocks). It is also provably secure: an adversary is unable to distinguish OCB-outputs from an equal number of random bits (privacy) and an adversary is unable to generate any valid <Nonce, Ciphertext, Authentication Tag> triple (authenticity). The indistinguishability from random strings implies that OCB is semantically secure [24], which ensures with high probability that duplicate tuples will be encrypted differently.

Encryption under OCB [24] requires an n-bit nonce I where n is the block size. The nonce would typically be an identifier selected by the sender. In OCB, two states, Offset and Checksum, are computed accumulatively as blocks are sequentially encrypted. The offset $Z[i]$ is used in encrypting and decrypting block i where $Z[0]=E_k(I\oplus E_k(0^n))$, $Z[i]=f(Z[i-1], i)$ for $i>0$ and some easily computable function $f(.,.)$. When encrypting a plaintext block $T[i]$, the ciphertext $C[i]=E_k(T[i]\oplus Z[i]$ for $1 \leq i < m$ where m is the total number of message blocks. The final cipher block $C[m]=T[m]\oplus Y[m]$ [first|T[m]bits] where $Y[m]=E_k(\text{len}(T[m])\oplus g(E_k(0^n))\oplus Z[m])$, len(T[m] the length of the final message block, and g(.) some easily computable function. The state Checksum=T$[1]\oplus \ldots \oplus T[m-1]\oplus C[m]0^*\oplus Y[m]$ and the tag $T=E_k$ (Checksum $\oplus Z[m]$) [first $\tau$ bits] where $C[m]0^*$ represents padding the last cipher block to the block size. The first $\tau$ bits are the authentication tag T. The nonce I and the ciphertext $C[1] \ldots C[m-1]C[m]T$ are transferred to the recipient.

When decrypting a ciphertext block $C[i]$, the plaintext $P[i]=E_k^{-1}(Z[i]\oplus C[i])\oplus Z[i]$ for $1\leq i<m$ where $Z[i]$ is computed from the received nonce. $Y[m]=E_k(\text{len}(C[m])\oplus g(E_k(0^n))\oplus Z[m])$. $P[m]=C[m]\oplus Y[m]$[first|C[m]|bit]. Checksum=$P[1]\oplus \ldots \oplus P[m-1]\oplus C[m]0^*\oplus Y[m]$. $T'=E_k$ (Checksum $\oplus Z[m]$)[8 first $\tau$ bits]. If $T'=T$, then accept the message, otherwise reject.

Since authenticated encryption is used, an adversary who does not know the key cannot impersonate $P_A$ or $P_B$, nor can it tamper with the encrypted tuples in any way that will not be detected. This is similar for communication of result T from to $P_C$.

Thus, the only vulnerability that an adversary can hope to exploit is the pattern in the interactions between S and T. The methods are designed to thwart the adversary from learning anything by observing this interaction.

To simplify exposition, it is assumed that the tuples of A, B, and C are of the same size. Free memory of the secure processor can hold at most M+2 such tuples and N is the maximum number of tuples from B that match a tuple from A. The methods have been designed to handle the general case where M<N. It is also assumed that M is much smaller than |A| or |B|.

The details of the communication between S, $P_A$, $P_B$, and $P_C$ are omitted from the methods. It is assumed that $P_A$ and $P_B$ have sent their encrypted relations A and B respectively to S, who has stored them on its local disk. Similarly, T writes the encrypted join result to S's disk (invoking the server process running on S), which S then sends to $P_C$. The methods will describe the code executed by T.

A transfer of data from T to S is indicated by prepending the operation with the keyword put; the keyword get will indicate a transfer from S to T. To denote the encryption and decryption functions, encrypt(•) and decrypt(•) are used, respectively. The use of keys in these functions are ignored. It is also assumed that the tuples comprise fixed sizes and that the server knows their sizes.

Issues such as schema discovery and schema mappings are not discussed. It is assumed that schemas can be shared. The design presented in [2] can be used for this purpose.

Two straightforward, but unsafe, adaptations of the nested loop join method are first presented. They are discussed as they help derive the design principles underlying the methods.

The following is a straightforward adaptation of the nested loop join method. T first obtains an encrypted tuple of A by sending a read request to S and decrypts the tuple inside its memory. T then reads a tuple of B, decrypts it, and compares it with the decrypted tuple of A. If the match succeeds, T encrypts the result tuple and outputs it to S to write to disk. The above step is repeated for the rest of the tuples B and then the procedure is repeated for the rest of the tuples of A.

Unfortunately, this straightforward adaptation is not safe, although the input as well as output values remain encrypted outside of T. An adversary (e.g., S colluding with $P_A$) can easily determine which encrypted tuples of A joined with which tuples of B, simply by observing whether T outputted a result tuple before the read request for the next B tuple. If this information becomes available to $P_A$, then $P_A$ can determine which of its tuples have a match with a tuple of $P_B$.

What if T waits for M tuples (or a random number of tuples <M) to be created and then outputs them in a block? Unfortunately, the adversary can still estimate the distribution of matches. In addition, the adversary can also launch timing attacks; since encryption takes significant time, it can determine whether there was a match by monitoring inter-request times for B tuples.

Two principles can be derived from the above discussion. First, the evaluation of the join predicate and the composition of tuples should take same time irrespective of whether the comparison yields a match. Second, there should not be any difference in the amount of output produced irrespective of whether the comparison yields a match.

As discussed above, an adversary can only infer information from the pattern of interactions between the server and the secure coprocessor. Therefore, for a method running on a secure coprocessor to be safe, it must not reveal any information from its accesses to the server. Building upon the definitions in [14], this intuition is formalized as follows:

Definition 1 (Safety of a Join Method) Assuming the database relations A, B, C and D, where |A|=|C|, |B|=|D|, A and C have identical schema, as do B and D. For any given N, $J_{AC}$ (respectively, $J_{CD}$) is the ordered list of server locations read and written by the secure coprocessor during the join of A (resp. C) and B (resp. D). The join method is safe if $J_{AC}$ and $J_{CD}$ are identically distributed.

If the access pattern is independent of the underlying data then the access pattern will be identical for all the relations that satisfy the conditions given in Definition 1. Therefore, to prove that a method is safe, as more fully described below, the access pattern does not depend on the data in the underlying relations.

The following remarks apply to all the methods. First, for safeguarding against timing attacks, an approach is to pad the variance in processing steps to constant time by burning CPU cycles as needed [12]. To keep the method descriptions simple, the steps that burn CPU cycles are not shown in any of the methods.

The methods encrypt a decoy plaintext and out-put it if necessary to prevent information leakage. Decoys are decrypted and filtered out by the recipient. They may take the form of a fixed string pattern. The semantically secure encryption generates indistinguishable cipher texts from multiple encryptions of the same plain text, which can be recovered from any one of them at the time of decryption [24].

In some applications, N might be known apriori. A safe estimate for N would be |B| but it can hurt performance, particularly if the actual value is much smaller. Guessing N too small and rerunning the method if the actual value happens to be larger leaks information. A safe way to compute exact N would be to run a nested loop join, but without outputting any result tuple. This pre-processing step does not leak information.

The cost of the methods is compared in terms of the number of tuple transfers between the secure processor and the server, assuming disk I/Os can be pipelined with the transfers between the server and the secure coprocessor. Every time the secure processor gets a tuple from the server, it is decrypted. Similarly, a tuple is encrypted before the secure coprocessor outputs it to the server. Thus, the number of transfers between the coprocessor and server also reflects the total number of encryption and decryption operations.

Two methods are presented for general joins in which the join predicate is specified through an arbitrary match( ) function. A join in this general setting requires every tuple of the outer relation to be compared with every tuple in the inner relation [7].

Method 1 has been designed for secure coprocessors with small memories. It outputs an encrypted join tuple if there is a match and an encrypted decoy of the same size otherwise. Because of semantically secure encryption, all the decoy tuples will look different and an adversary cannot decipher whether there was a match or not.

Using the above strategy, a straightforward method will generate an output of size |A||B|. Method 1 generates N|B| output tuples by using scratch[ ] array of size 2N allocated in S's memory. In a pass over B, after processing every N tuples (a round), T obliviously sorts scratch[ ] giving lower priority to decoy tuples. Consequently, any joined tuples in the last N location of scratch[ ] will be moved to the first locations of scratch[ ]. However, because of sorting being oblivious, an adversary cannot know the boundary. After the last round, the first N locations of scratch[ ] will contain only the result tuples and possibly some decoy tuples and the server writes them to disk.

---

Method 1: For Secure Coprocessors with Small Memory

```
for each tuple a ∈ A do
    put 2N encrypted decoy tuples to scratch[ ];
    a𝒟 = decrypt(get a);
    i = 0
    for each tuple b ∈ B do
        b𝒟 = decrypt(get b);
        if match (a𝒟 b𝒟) then
            put scratch[(i mod N) + N] =
                encrypt(join(a𝒟 b𝒟));
        else
            put scratch[(i mod N) + N] =
                encrypt(join(decoy, decoy));
        end if
        i = i + 1;
        if i mod N == 0 then
            Obliviously sort scratch[ ] giving lower priority
            to decoy
            tuples;
        end if
    end for
    if i mod N ≠ 0 then
        Obliviously sort scratch[ ] giving lower priority to
        decoy tuples;
    end if
    Request 𝒮 to write first N of scratch[ ] to disk;
end for
```

---

An oblivious sorting method sorts a list of encrypted elements such that no observer learns the relationship between the position of any element in the original list and the output list. Oblivious sorting of a list of n elements using the Bitonic sort method proceeds in stages [6]. Assuming n is a power of 2, at each stage, the n elements are divided into sequential groups of size $2^i$ where i depends on the stage. Within each group, an element is compared with one that is $2^i-1$ elements away. Each pair of the encrypted elements is brought into the secure coprocessor, decrypted, compared, and re-encrypted before they are written out to their original positions possibly swapped. There are a total of approximately $$\frac{1}{2}(\log n)^2$$

stages and $$\frac{1}{2}n$$

comparisons at each stage. Therefore, the cost of oblivious Bitonic sort is ¼n(log₂ n)²

$$\frac{1}{4}n(\log_2 n)^2$$

comparisons and n(log₂ n)² transfers between the secure coprocessor and the server.

Since both A and B are accessed sequentially, they can be encrypted using the procedure described above. However, oblivious sorting of scratch[ ] requires non-sequential access to its tuples. Next, the encryption of tuples in scratch[ ] are described in the OCB mode. It is assumed that the size of a tuple is the same as the length of one cipher block.

After an oblivious sort, the first locations of the array scratch[ ] contain the joined tuples that T has seen so far and possibly some decoy tuples; the last locations contain decoy tuples. Conceptually, the first N tuples in scratch[ ] and the N output tuples from the next round will be treated as one message.

At the end of the last stage of an oblivious sort, T keeps the following two states for continuing encryption in the next round: an offset Z[N] and a Checksum=T[1]⊕ . . . ⊕T[N] where T[i] are the plaintext of tuples in the first N locations in scratch[ ]. In the next round, $\mathscr{E}$ encrypts the N output tuples as message blocks T[N+1] through T[2N] and computes a tag for the entire message.

Next, performing encryption and decryption when obliviously sorting scratch[ ] is described. T generates a fresh nonce for re-encrypting output tuples at each stage of the Bitonic sort. When comparing a pair of tuples, T decrypts scratch[i] and scratch[j], compares them, then re-encrypts them with offsets Z[i] and Z[j] computed from the fresh nonce for the current stage. T then computes Checksum=Checksum P[i]⊕ P[j]. At the end of a stage, if T accepts the 2N tuples it just decrypted, it continues to the next step, otherwise, it terminates the computation. After re-encrypting the last tuple for a stage, T computes the tag for the 2N tuples it just encrypted and keeps this tag in the memory for the authentication check at the next stage.

Next, the extra cost of encrypting n tuples (elements) non-sequentially is investigated. As before, the size of a tuple is the same as the length of one cipher block. In Bitonic sort, an element is compared with one that is half the distance away in the same group. In order to decrypt the $(n/2+_1)^{th}$ element without sequentially decrypting every tuple before it, the function $f(.,.)i=n/2$ times is applied to obtain $Z[i+1]=f(\ldots f(f(Z[1]2),3)\ldots,i+1)$. Then the second element is compared with the $(n/2+2)^{th}$ element and $Z[2]=f(Z[1])$ and $Z[i+2]=f(Z[i+1]i+2)$, and so on. Thus, within the same group, no additional application of $f(.,.)$ is required except for the first pair. Hence, at a stage in which there are j groups of size i where ij=n, the total additional $f(.,.)$ applications is $$\frac{1}{2}ij = n/2.$$

Since there are $$\frac{1}{2}(\log n)^2$$

stages in Bitonic sort, a total of additional $$\frac{n}{4}(\log n)^2$$

applications of $f(.,.)$ are needed for sorting a set of n elements compared to sequentially encrypting n elements at each stage.

For every tuple of A, the method goes through the same number of rounds (⌈|B|/N⌉). In every round, T outputs the same amount (N tuples) to the same locations of scratch[ ]. After all the rounds are over, T obliviously sorts scratch[ ], which accesses scratch[ ] independent of the underlying data. Finally, the first N locations of scratch[ ] are accessed for writing the result tuples to disk. Thus, Definition 1 is satisfied.

During the execution of Method 1, T gets |A| tuples from A and |A||B| tuples from B. It outputs 2N decoy tuples for each a∈A, for a total of 2|A|N decoy tuples. For each comparison of a∈A and b∈B, T outputs a result tuple, for a total of |A||B| output tuples. For every a∈A and every block of N tuples in B, T obliviously sorts 2N tuples, which leads to transferring a total of 2|A||B|(log₂(2N))² tuples into and out of T's memory. Finally, the server writes N|A| tuples to disk.

Thus, in terms of the number of tuple transfers in and out of T's memory, the complexity of Method 1 is:

|A|+2N|A|+2|A||B|+2|A||B|(log₂(2N))².

Method 2 has been designed for secure coprocessors with larger memories. It optimizes the use of the memory of the secure processor to reduce the number of output tuples, while not leaking any information in the process.

Define γ=max(1, ⌈N/(M−δ)⌉). Here δ represents the small amount of memory needed for data structures other than those needed for holding the input and result tuples (e.g. counters). For every tuple a of A, T reads entire B a total of γ times to find all the matches for a. Conceptually, the tuples from B that match a are partitioned into γ groups of ⌈N/γ⌉ tuples each. During pass i over B, T computes the $i^{th}$ group of the matched tuples and outputs them to S at the end of the pass. Unlike the blocked nested loop join in which the input relations are partitioned in chunks of fixed size, the partitioning here is over the matched tuples.

N is the maximum number of B tuples that match with any of the tuples in A. There may be tuples in A that match with less than N tuples of B. In that case, when T runs out of real join tuples, it outputs an appropriate number of decoy tuples.

Since both A and B are accessed sequentially and the output tuples are also produced sequentially, they can be encrypted using the procedure described above.

---

Method 2: For Secure Coprocessors with Larger Memories

```
γ = max (1,⌈ N/(M - δ)⌉); {#passes over B for every A tuple}
blk = ⌈ N/γ; {#output tuples in a pass}
for each tuple a ∈ A do
    a𝒯 = decrypt(get a);
    last = 0; {position of the last matched B tuple}
    for i = 1 to γ do
        matches = 0; {#matches in the current pass}
        current = 0; {position of the current B tuple}
        for each tuple b ∈ B do
            b𝒯 = decrypt(get b);
            if current > last and matches < blk then
                if match(a𝒯 b𝒯) then
                    joined[matches] =
                        encrypt(join(a𝒯 b𝒯));
                    matches = matches + 1;
                    last = current;
                end if
            end if
```

```
Method 2: For Secure Coprocessors with Larger Memories current = current + 1;
        end for
        append (blk - matches) encrypted decoy tuples to joined[ ];
        put joined[ ] to 𝒮,
            Request 𝒮 to write joined[ ] to disk;
    end for
end for
```

Every tuple A of causes γ passes over B. After every pass over B, T sends an output of fixed size to S. Thus, the access pattern is independent of the underlying data and Definition 1 is satisfied.

During the execution of Method 2, T gets |A| tuples from A, γ|A||B| tuples from B, and outputs N|A| tuples. Finally, the server writes N|A| tuples to disk.

Therefore, in terms of the number of tuple transfers in and out of T's memory, the complexity of Method 2 is:

$$|A|+N|A|+\gamma|A||B|.$$

Next, partitioning T's memory between the input and the result tuples to minimize the number of transfers between T and S is discussed. $F=M+1-\delta$ is defined where δ represents the small amount of memory needed for data structures other than the input and result tuples. The following two cases are considered separately: (1) $N>F$, and (2) $N \leq F$.

For Case (1), blocking of A is not helpful, as explained below. So, only one tuple of A is kept in memory and the problem reduces to one of optimally partitioning F between the tuples from B and the joined tuples. $F=F_b+F_j$, where $F_b$ denotes the number of B tuples and $F_j$ represents the number of joined tuples. The goal is to find $F_b$ and $F_j$ such that the number of transfers for joining an A tuple with B is minimized.

For each $a \in A$, it is optimal to scan B a total of $\gamma=\lceil N/(M-\delta) \rceil$ times. For each scan of B, T outputs $blk=\lceil N/\gamma \rceil$ joined tuples where $blk<M-\delta$. $M-\delta-blk$ tuples are allocated for B tuples. Thus, the partition is $F_b=M-\delta-blk$ and $F_j=blk$.

For Case (2), the free memory of T is partitioned among the tuples in A, B, and the joined tuples. $F=F_a+F_b+F_j$, where $F_a$ denotes the number of tuples from A, $F_b$ the number of tuples from B, and $F_j$ the number of joined tuples. The goal is to find $F_a$, $F_b$, and $F_j$ such that the number of transfers for joining A with B is minimized.

When T can hold more than N tuples, it is optimal if T scans B at most once for each $a \in A$. K is defined to be the largest integer such that $K(1+N) \leq F$, i.e., T can hold K tuples in A and all of their up to K N matching tuples. Then the optimal way to partition the memory is $F_a=K$, $F_b=F-K(1+N)$, and $F_j=KN$.

Blocking of A does not result in any performance gain. It is assumed that A is partitioned into blocks of size K. For each tuple in a block, T allocates a piece of memory to hold a maximum of $N'<N$ joined tuples. T reads into its memory one block L of A at a time. For each L, T scans the entire table B a total of $P=\lceil N/N' \rceil$ times to find a maximum of $PN'$ matching tuples for each tuple in A. The matching tuples are padded for each $a \in A$ to a total of $PN'$ tuples. Conceptually, these tuples are portioned into P groups. During each pass i of B, T retains the $i^{th}$ group of the $PN'$ matching tuples for each element in L and outputs to S the matching tuples at the end of each pass.

The complexity of this method is $\lceil |A|/K \rceil \cdot N/N' \rceil |B|$ where $\lceil |A|/K \rceil$ represents the number of blocks in A and $\lceil N/N' \rceil$ the number of scans of B per block. It is assumed that |A| is an integer multiple of K, and N is an integer multiple of N' and M respectively. The complexity for Method 2 is $\gamma|A||B|$. Since $KN'<M$, blocking A is computationally more expensive than the non-blocking case. In terms of transfers between T and S, Method 2 does $|A|+\gamma|A||B|+N|A|$ tuple transfers while the blocking version does $|A|+\lceil |A|/K \rceil \cdot N/N' \rceil |B|+N|A|$ transfers. The non-blocking version performs less transfers.

There may be a server in which more than one secure coprocessor is attached to the server. Both the above methods (as well as the Method 3, below) are easy to parallelize with a linear speed-up in the number of processors.

The case of equijoins is now investigated. Some well known methods cannot be enhanced with security features. False starts are reported and a safe method is presented.

The adaptation of sort-merge join, grace hash join, and the idea of commutative encryption from [3, 18, 16] are explored.

It is assumed $M=10$ and for a particular tuple $a \in A$ there are 3 matches in B. After the third match, when T reads the next tuple from B, it realizes that there is no more matches in B for a. Therefore, T will read the next tuple from A. Such an execution will reveal the number of matches for each tuple.

The family of grace hash join methods [9, 20] are considered. They begin by partitioning A and B into disjoint subsets called buckets, which have the property that all tuples with the same hash of the join attribute value share the same bucket. The corresponding buckets are then joined to produce the result.

The method below depicts an attempt to ensure that the partitioning of a relation into bucket does not leak information. The basic idea is to fill any empty space in all other buckets with decoy tuples as soon as one of them becomes full and output all of them to the server.

Obliviously shuffle A (see [18]);

```
for each a ∈ A do
    a𝒯 = decrypt(get a);
    Place encrypt(a) into the i^{th} bucket, where i = hash(a𝒯 joinattr);
    if the i^{th} bucket is full then
        Fill all other buckets with decoy tuples and output all the
            buckets to 𝒮,
    end if
end for
```

Unfortunately, the partitioning phase unavoidably leaks partial information. For example, an adversary can distinguish between a uniformly distributed relation B and a highly skewed one. Assume the size of a bucket is p tuples and the number of buckets is n.

When partitioning A, all of the buckets will fill up at relatively the same speed. T will output the buckets after it has read and hashed about np tuples. On the other hand, when partitioning B, one of the buckets will fill up much faster than the rest. T will now output the buckets after reading a little more than p tuples. By observing the difference in the number of tuples T reads between writes, an adversary may learn partial information about the distribution of the values of the join attribute.

A method inspired by the idea of commutative encryption used in [3, 8, 16] is now considered.

The first encryption is done by the data providers before sending their relations to S. Now, T executes the method below. T employs symmetric encryption [25] using the same key for re-encrypting the two relations.

Obliviously shuffle A;

```
for each a ∈ A do
    a𝒯 = decrypt(get a);
    put symmetric encrypt(a𝒯);
end for
Similarly re-encrypt B using same key;
Do sort-merge join on the encrypted relations; {Can be done by
server}
Unfortunately, this adaptation is also unsafe (leaks the distribution
of the duplicates).
```

A safe sort-based equijoin method is now presented. This method can be viewed as a specialization of Method 1. It is assumed that T has obliviously sorted B. The B tuples that will join with an A tuple will come from at most N consecutive positions in B. This observation is used to avoid the processing of B in rounds and obliviously sorting scratch[ ] after each round. The size of scratch[ ] now reduces to N tuples.

For every A tuple, Method 3 initializes scratch[ ] with N decoy tuples. Now, for every tuple that T reads from B, T also reads a specific location from scratch[ ] in a circular fashion; for the $i^{th}$ tuple, T reads scratch[i mod N]. T writes back to the same location either the value just read (though encrypted differently so it is indistinguishable to the adversary) or the joined tuple if the tuple from B matches the tuple of A. A concern is how to avoid overwriting real result tuple from a previous match. The overwriting will not happen because all the real result tuples will be in at most N consecutive positions in scratch[ ].

To ensure authenticated computation, both A and B relations need to be encrypted under OCB mode. Since A is accessed sequentially, it can be encrypted using the procedure described above. However, B requires oblivious sorting. Hence, its encryption should use the strategy described for encrypting scratch[ ] array, as more fully described below.

Encrypting and decrypting tuples in scratch[ ] in the OCB mode is now described. A round is referred to T reading tuples from 0 to N−1 in scratch[ ]. In each round, T treats the N tuples written to and read from and scratch[ ] as one message respectively. In each round, if T accepts the N tuples it decrypted, it continues to the next round; otherwise it terminates the computation. For the N output tuples in each round, T encrypts them in the OCB mode with a fresh nonce and the same encryption key.

Since B is sorted obliviously, this step is safe. After getting a tuple from B, T reads a specific location from scratch[ ] and writes something of the same size back to the same location. These actions are executed regardless of the content of the underlying relations. Therefore, Definition 1 is satisfied.

T first obliviously sorts B leading to a total of $|B|(\log_2|B|)^2$ tuple transfers. During the rest of the execution, T gets $|A|$ tuples from A and $|A||B|$ tuples from B. For every tuple of A, T outputs N decoy tuples, for a total of N|A| decoy tuples. For every tuple of A and B, T gets a decoy tuple from S and outputs a result tuple, for a total of $|A||B|$ gets of decoy tuples and $|A||B|$ puts of result tuples. Finally, the server writes A|A| tuples to disk.

Thus, in terms of transfers in and out of T's memory, the complexity of Method 3 is:

$$|A|+|A|N+|B|(\log_2|B|)^2+3|A||.$$

If the data providers can send sorted data to the service, the step of oblivious sorting can be avoided and the complexity becomes:

$$|A|+|A|N+3|A||B|.$$

The performance characteristics of the methods are studied. Two parameters are identified: $a=N/|B|$; and $\gamma=\lceil N/M \rceil$ (ignoring 1-δ). Specifically, $a \in [1/|B|,1]$ assuming there is at least one matching tuple for every a∈A, and $\gamma \in [1,|B|]$.

Two other parameters are: (i) the size of the tuples, and (ii) the size of the relations. The first plays an insignificant role in Methods 1 and 3.

For Method 2, its effect can be understood by understanding γ. The running time of the methods increases quadratically in terms of the size of the relations. The performance with respect to a and γ is studied.

Taking $|A|=|B|$, the cost formulas for the three methods are rewritten as follows:

| | |
|---|---|
| $|B|+2|B|^2+2a|B|^2+2|B|^2(\log 2a|B|)^2$ | Method 1 |
| $|B|+a|B|^2+\gamma|B|^2$ | Method 2 |
| $|B|+3|B|^2+a|B|^2+|B|(\log|B|)^2$ | Method 3 |

Method 2 dominates the other two methods. To see this, a is set to 1 (the largest value it can take) for Method 2 and set to $1/|B|$ (the smallest value) for Methods 1 and 3. The cost formulas are examined.

When the maximum number of B tuples that join with any of the A tuples can fit in the free memory of T, γ is 1. In this case, Method 2 designed for general joins beats a specialized method that works only for equijoins. The relative performance gap increases as the size of the relations increases.

Method 1 outperforms Method 2 when $\gamma > 2+a+2(\log 2a|B|)^2$. $1/|B|$ is substituted for a (the smallest value it can take). Method 1 outperforms Method 2 when $\gamma > 4$, i.e., N is more than 4 times the free memory of the secure coprocessor. For a fixed table size $|B|$, as a increases, γ also increases.

Both Methods 1 and 3 are insensitive to γ. For comparing them, a is substituted in the last term in the cost formula for Method 1 with $1/|B|$, the smallest value a takes. The cost formula for Method 1 is rewritten as $|B|+2|B|^2+2a|B|^2+2|B|^2$. Then the comparison of Method 3 to Method 1 reduces to comparing $|B|(\log|B|)^2$ and $a|B|^2+|B|^2$. In this case, Method 3 outperforms Method 1 for any value of a and $|B|$.

Finally, Method 3 is compared to Method 2. Their cost comparison boils down to comparing $3|B|^2+|B|(\log|B|)^2$ with $\gamma|B|^2$. When $\gamma \le 3$, Method 2 outperforms Method 3 regardless of the value of $|B|$. When $3<\gamma\le4$, Method 3 outperforms Method 2 for sufficiently large $|B|$. When $\gamma \ge 4$, Method 3 outperforms Method 2 whenever $|B| \ge 1$.

FIG. 1 summarizes the performance relationship among the three methods. An unlabeled arrow pointing from Method X to Y denotes that X dominates Y. A labeled arrow from X to Y indicates the condition under which X outperforms Y; the performance relationship is reversed if the condition is not satisfied. The arrows are labeled with only the significant conditions.

The performance of the methods are compared to the technique for secure function evaluation (SFE), based on secure circuit evaluation [13, 31]. Since Method 2 performs better than Method 1, Method 1 is conservatively compared to the technique, provided in [22, 23].

The number of communications will be compared in this analysis. Again being conservative, communication between the secure coprocessor and the server it is attached to in the case of Method 1 is compared to the communication across wide-area network in the case of SFE.

It is assumed $|A|=|B|$ and that each tuple is w bits wide. It is assumed that the output has $|B|Nw$ bits and that the circuit for matching two w-bit tuples requires $G_e(w)$ gates. Then a secure circuit for general join will have at least $|B| G_e(w)$ gates. $G_e(w) \geq 2w$ in the simple case that two tuples are matched if their $L^1$ Norm is smaller than some threshold.

It is assumed $k_0$ is the number of bits in the supplemental keys used while building the circuit, the cheating probability of $P_A$ is exponentially small in 1, and the cheating probability of $P_B$ is exponentially small in n. In practice, $k_0 \geq 64$ and $l=n \geq 50$.

$P_A$ and $P_B$ need to make at least $|B|w$ 1-out-of-2 oblivious transfers where each oblivious transfer uses one public key encryption, $4l|B|^2 G_e(w)$ pseudo-random function evaluations, $2l|B|wN$ public key encryptions for partial proofs of knowledge and gradual opening of commitments, and $nl|B|wN$ public key encryptions for blind signatures.

$P_A$ needs to send 2l copies of $4k_0B^2G_e(w)$ bit encrypted circuit to $P_B$ and send at least $32 \, lk_1$ bits for each oblivious transfer. Here, $k_1$ is the security parameter for oblivious transfer; $k_1 \geq 100$ in practice. $P_B$ sends $2nl|B|wNk_1$ bit commitments to $P_A$.

Total communication cost can thus be estimated as $$8lk_0|B|^2G_e(w) + 32lk_1(|B|w) + 2nlNk_1(|B|w).$$

To compare the communication cost of SFE and the solution of embodiments herein, the cost formula for Method 1 is multiplied with w. $k_0=64$, $k_1=100$, $l=n=50$; and $G_e(w)=2w$. For low values of α, it can be seen that SFE can be orders of magnitude slower.

Thus, a secure information sharing service is presented offering sovereign joins, built using off-the-shelf secure coprocessors. The design can do general joins involving arbitrary predicates across any number of sovereign databases; nothing apart from the result is revealed to the recipients; the only trusted component is the secure coprocessor; and the system is provably secure.

Other contributions include formulation of the problem of computing join in which the goal is to prevent information leakage through patterns in I/O while maximizing performance. Further, articulation of the criteria for proving the security of a join method in such an environment is provided. Moreover, development of safe methods for different operational parameters and their cost analysis is provided.

Thus, embodiments herein provide a method, system, etc. for a sovereign information sharing service. More specifically, a method for secure distributed query processing comprises storing data tables from at least one data provider in at least one first computer comprising a sovereign server (also referred to herein as "S"). As described above, S offers sovereign information sharing on a general purpose computer, wherein S is un-trusted. Next, encrypted input and output of the data tables is performed between the server and a second computer (also referred to herein as "T"). As described above, T is a secure coprocessor that is attached to S, wherein the only trusted component is T.

Following this, join operations are computed, comprising determining whether arbitrary join predicates yield matches within the data tables; and encrypted results of the join operations are output. The method minimizes possible information leakage from interaction between the server and the second computer by making observations and inferences from patterns of the outputting of the encrypted results. As described above, the only vulnerability that an adversary can hope to exploit is the pattern in the interactions between S and T. As such, the methods herein are designed to thwart the adversary from learning anything by observing this interaction.

Furthermore, the outputting of the encrypted results comprises outputting a size of the results and a processing time that are independent of whether the arbitrary join predicates yield the matches. Specifically, this comprises outputting decoys and performing additional CPU cycles to increase the processing time. As described above, the decoys are decrypted and filtered out by the recipient.

Thus, a method is provided for secure distributed query processing, comprising performing encrypted input and output of data tables between a server (i.e., S) and a secure computer (i.e., T), and performing queries of the data tables to produce results. As described above, no party, including S, can observe the state of the computation inside T or tamper with the code loaded onto it. The method modifies the results by at least one of increasing a size of the results, comprising adding decoys to the results; increasing a processing time of the results, comprising performing additional CPU cycles; and, encrypting the results to produce modified results. The modifying of the results is independent of whether data matches corresponding to the queries exist within the data tables. Following this, the method outputs the modified results. As described above, any temporary value output by T to S is encrypted.

Figure 2:
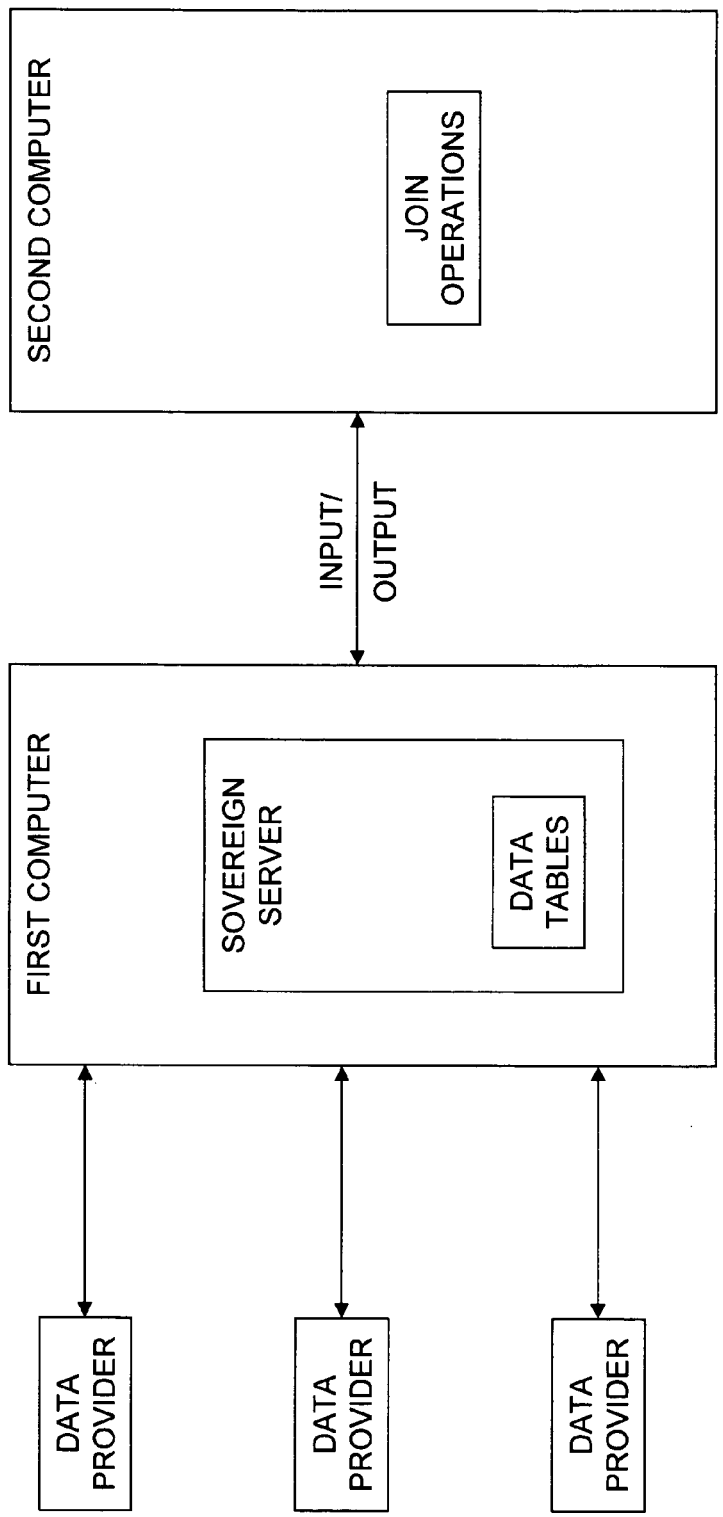
FIG. 2 is a diagram illustrating a system for secure distributed query processing.

As illustrated in FIG. 2, embodiments herein further provide a system for secure distributed query processing, comprising at least one first computer, comprising a sovereign server (i.e., S) adapted to store data tables from at least one data provider, and a second computer (i.e., T) operatively connected to the first computer. The second computer is adapted to perform encrypted input and output of the data tables with the first computer, compute join operations to determine whether arbitrary join predicates yield matches within the data tables, and output encrypted results of the join operations. As described above, an encryption scheme is provided comprising both message privacy and message authenticity. Moreover, the second computer is adapted to output a fixed size of the encrypted results during a fixed processing time.

The fixed size of the encrypted results during the fixed processing time is adapted to minimize information leakage from interaction between the first computer and the second computer, wherein the information leakage comprises observations and inferences from patterns of the encrypted results. As described above, the only vulnerability that an adversary can hope to exploit is the pattern in the interactions between S and T. As such, the methods herein are designed to thwart the adversary from learning anything by observing this interaction. Further, the fixed size of the encrypted results and the fixed processing time are independent of whether the arbitrary join predicates yield the matches. Specifically, the fixed size of the encrypted results comprises decoys and the fixed processing time comprises additional CPU cycles. As described above, the decoys may take the form of a fixed string pattern.

Thus, a system for secure distributed query processing is provided comprising a secure computer (i.e., T) adapted to perform encrypted input and output of data tables with a server (i.e., S), perform queries of the data tables to produce results, modify the results to produce modified results, and output the modified results. As described above, T holds a copy of the contract and serves as an arbiter of it. Contracts are kept encrypted at S. The modified results comprise a fixed size and/or a fixed processing time, wherein the modified results are independent of whether data matches corresponding to the queries exist within the data tables. As described above, if the access pattern is independent of the underlying data, then the access pattern will be identical for all the relationships that satisfy the conditions given in Definition 1. Further, the modified results comprise decoys and/or additional CPU cycles. As also described above, the semantically secure encryption generates indistinguishable cipher texts from multiple encryptions of the same plain text, which can be recovered by any one of them at the time of decryption.

Figure 3:
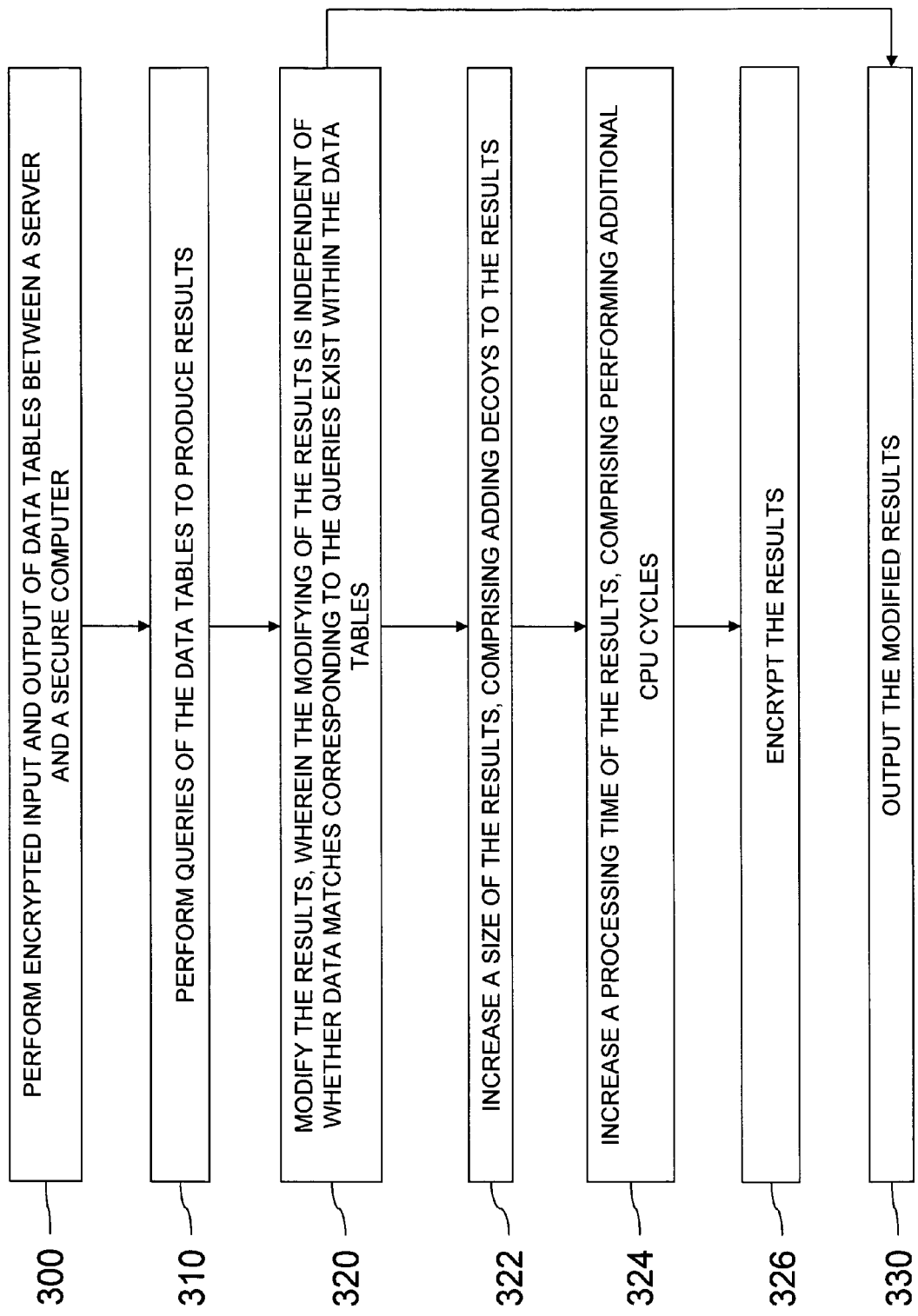
FIG. 3 is a flow diagram illustrating a method for secure distributed query processing.

FIG. 3 illustrates a flow diagram of a method for secure distributed query processing. The method begins by performing encrypted input and output of data tables between a server and a secure computer (item 300), and performing queries of the data tables to produce results (item 310). As described above, no party, including S, can observe the state of the computation inside T or tamper with the code loaded onto it. Next, in item 320, the method modifies the results by at least one of increasing a size of the results (item 322), comprising adding decoys to the results; increasing a processing time of the results (item 324), comprising performing additional CPU cycles; and, encrypting the results (item 326) to produce modified results. The modifying of the results is independent of whether data matches corresponding to the queries exist within the data tables. Following this, in item 330, the method outputs the modified results. As described above, any temporary value output by T to S is encrypted.

Accordingly, a secure information sharing service is presented offering sovereign joins, built using off-the-shelf secure coprocessors. The design can do general joins involving arbitrary predicates across any number of sovereign databases; nothing apart from the result is revealed to the recipients; the only trusted component is the secure coprocessor; and the system is provably secure.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

REFERENCES

[1] N. Abe, C. Apte, B. Bhattacharjee, K. Goldman, J. Langford, and B. Zadrozny. Sampling approach to resource light data mining. In *SIAM Workshop on Data Mining in Resource Constrained Environments*, 2004.

[2] R. Agrawal, D. Asonov, P. Baliga, L. Liang, B. Prost, and R. Srikant. A reusable platform for building sovereign information sharing applications. In *1st Workshop on Databases in Virtual Organisations*, June 2004.

[3] R. Agrawal, A. Evfimievski, and R. Srikant. Information sharing across private databases. In *Proc. of the 2003 ACM SIGMOD Int'l Conf. on Management of Data*, San Diego, Calif., June 2003.

[4] J. P. Anderson. Computer security technology planning study. Technical Report ESD-TR-73-51, Vol II, HQ Electronic Systems Division (AFSC), L. G. Hanscom Field, Bedford, Mass., October 1972.

[5] D. Asonov. *Querying Databases Privately*. PhD thesis, Springer Verlag, June 2004.

[6] K. E. Batcher. Sorting networks and their applications. In *Proc. of AFIPS Spring Joint Comput. Conference, Vol. 32*, 1968.

[7] K. C. Chang and S. Hwang. Minimal probing: Supporting expensive predicates for top-k queries. In *Proc. of the 2002 ACM SIGMOD Int'l Conf. on Management of Data*, Madison, Wis., June 2002.

[8] C. Clifton, M. Kantarcioglu, X. Lin, J. Vaidya, and M. Zhu. Tools for privacy preserving distributed data mining. *SIGKDD Explorations*, 4(2):28-34, January 2003.

[9] D. J. DeWitt and R. Gerber. Multiprocessor hash-based join algorithms. In *Proc. of the 11th Conference on Very Large Databases, Stockholm*, 1985.

[10] M. J. Freedman, K. Nissim, and B. Pinkas. Efficient private matching and set intersection. In *Proc. Advances in Cryptology—EUROCRYPT 2004*, Interlaken, Switzerland, May 2004.

[11] V. Gligor and P. Donescu. Fast encryption and authentication: XCBC encryption and XECB authentication modes, 2000.

[12] K. Goldman and E. Valdez. Matchbox: Secure data sharing. *IEEE Internet Computing*, 8(6):18-24, 2004.

[13] O. Goldreich. *Foundations of Cryptography*, volume 2: Basic Applications. Cambridge University Press, May 2004.

[14] O. Goldreich and R. Ostrovsky. Software protection and simulation on oblivious RAMs. *J. ACM*, 43(3):431-473, May 1996.

[15] P. Gutmann. An open-source cryptographic coprocessor. In *USENIX*, 2000.

[16] B. A. Huberman, M. Franklin, and T. Hogg. Enhancing privacy and trust in electronic communities. In *Proc. of the 1st ACM Conference on Electronic Commerce*, pages 78-86, Denver, Colo., November 1999.

[17] IBM Corporation. IBM 4758 Models 2 and 23 PCI cryptographic coprocessor, 2004.

[18] A. Iliev and S. Smith. Privacy-enhanced credential services. In *2nd Annual PKI Research Workshop, NIST, Gaithersburg*, April 2003.

[19] C. S. Jutla. Encryption modes with almost free message integrity. *Lecture Notes in Computer Science*, 2045:529-544, 2001.

[20] M. Kitsuregawa, H. Tanaka, and T. Moto-Oka. Application of hash to data base machine and its architecture. *New Generation Computing*, 1(1), March 1983.

[21] T. Kontzer. Airlines and hotels face customer concerns arising from anti-terrorism efforts. *Information Week*, March 2004.

[22] D. Malkhi, N. Nisan, B. Pinkas, and Y. Sella. Fairplay—a secure two-party computation system. In *Usenix Security '2004*, August 2004.

[23] B. Pinkas. Fair secure two-party computation. In Advances in *Cryptology—EUROCRYPT '2003*, volume 2656 of *Lecture Notes in Computer Science*, pages 87-105. Springer-Verlag, May 2003.

[24] P. Rogaway, M. Bellare, and J. Black. OCB: A blockcipher mode of operation for efficient authenticated encryption. *ACM Transactions on Information and System Security*, 6(3):365-403, August 2003.

[25] B. Schneier. *Applied Cryptography*. John Wiley, second edition, 1996.

[26] S. Smith and S. Weingart. Building a high-performance, programmable secure coprocessor. Research Report RC 21102, IBM T. J. Watson Research Center, Yorktown Heights, N.Y., February 1998.

[27] S. W. Smith. Secure coprocessing applications and research issues. Los Alamos Unclassified Release RLA-UR-96-2805, Los Alamos National Laboratory, Los Alamos, N. Mex., August 1996.

[28] S. W. Smith and D. Safford. Practical server privacy with secure coprocessors. *IBM Systems Journal,* 40(3), September 2001.

[29] Trusted Computing Group. TCG specification architecture overview, 2004.

[30] WetStone Technologies. TIMEMARK timestamp server, 2003.

[31] A. C. Yao. How to generate and exchange secrets. In *Proc. of the 27th Annual Symposium on Foundations of Computer Science,* pages 162-167, Toronto, Canada, October 1986.

[32] B. S. Yee. *Using Secure Coprocessors.* PhD thesis, Carnegie Mellon University, May 1994.

[33] B. S. Yee and J. D. Tygar. Secure coprocessors in electronic commerce applications. In *The First USENIX Workshop on Electronic Commerce,* July 1995.

What is claimed is:

1. A computer-implemented method for secure distributed query processing, comprising:
   storing data tables from at least one data provider in at least one first computer comprising a sovereign server;
   performing encrypted input and output of said data tables between said server and a second computer;
   computing join operations, comprising determining whether arbitrary join predicates yield matches within said data tables;
   outputting encrypted results of said join operations,
   where said data tables include database relations A, B, C and D,
   where $|A|=|C|$, and $|B|=|D|$,
   where A and C have identical schema, and B and D have identical schema,
   where for any given maximum number of tuples from B that match a tuple from A, $J_{AC}$, and $J_{BD}$ are ordered lists of server locations read and written by the sovereign server during the join of A with respect to C, and the joint of B with respect to D, respectively, and
   where $J_{AC}$ and $J_{BD}$ are identically distributed.

2. The computer-implemented method according to claim 1, further comprising performing additional CPU cycles to increase said processing time.

3. The computer-implemented method according to claim 1, wherein said outputting of said encrypted results comprises outputting a size of said results that is independent of whether said arbitrary join predicates yield said matches.

4. The computer-implemented method according to claim 1, wherein said outputting of said encrypted results comprises outputting decoys.

5. A computer-implemented method for secure distributed query processing, comprising:
   performing encrypted input and output of data tables between a server and a secure computer;
   performing queries of said data tables to produce results;
   modifying said results by at least one of increasing a size of said results, and increasing a processing time of said results to produce modified results; and
   outputting said modified results; and
   where said data tables include database relations A, B, C and D,
   where $|A|=|C|$, and $|B|=|D|$,
   where A and C have identical schema, and B and D have identical schema,
   where for any given maximum number of tuples from B that match a tuple from A, $J_{AC}$, and $J_{BD}$ are ordered lists of server locations read and written by said server during the join of A with respect to C, and the joint of B with respect to D, respectively, and where $J_{AC}$ and $J_{BD}$ are identically distributed.

6. The computer-implemented method according to claim 5, wherein said modifying of said results is independent of whether data matches corresponding to said queries exist within said data tables.

7. The computer-implemented method according to claim 5, wherein said increasing of said size of said results comprises adding decoys to said results.

8. The computer-implemented method according to claim 5, wherein said increasing of said processing time of said results comprises performing additional CPU cycles.

9. A system for secure distributed query processing, comprising:
   at least one first computer comprising a sovereign server adapted to store data tables from at least one data provider; and
   a second computer operatively connected to said first computer, wherein said second computer is adapted to perform encrypted input and output of said data tables with said first computer, compute join operations to determine whether arbitrary join predicates yield matches within said data tables, and output encrypted results of said join operations, and
   where said data tables include database relations A, B, C and D,
   where $|A|=|C|$, and $|B|=|D|$,
   where A and C have identical schema, and B and D have identical schema,
   where for any given maximum number of tuples from B that match a tuple from A, $J_{AC}$, and $J_{BD}$ are ordered lists of server locations read and written by the sovereign server during the join of A with respect to C, and the joint of B with respect to D, respectively, and
   where $J_{AC}$ and $J_{BD}$ are identically distributed.

10. The system according to claim 9, wherein said size of said encrypted results is independent of whether said arbitrary join predicates yield said matches.

11. The system according to claim 9, wherein said size of said encrypted results comprises decoys.

12. The system according to claim 9, wherein said processing time is independent of whether said arbitrary join predicates yield said matches.

13. The system according to claim 9, wherein said processing time comprises additional CPU cycles.

14. A system for secure distributed query processing, comprising:
   a secure computer adapted to perform encrypted input and output of data tables with a server, perform queries of said data tables to produce results, modify said results to produce modified results, and output said modified results,
   where said data tables include database relations A, B, C and D,
   where $|A|=|C|$, and $|B|=|D|$,
   where A and C have identical schema, and B and D have identical schema,
   where for any given maximum number of tuples from B that match a tuple from A, $J_{AC}$, and $J_{BD}$ are ordered lists of server locations read and written by said server during the join of A with respect to C, and the joint of B with respect to D, respectively, and
   where $J_{AC}$ and $J_{BD}$ are identically distributed.

15. The system according to claim 14, wherein said modified results are independent of whether data matches corresponding to said queries exist within said data tables.

16. The system according to claim 14, wherein said modified results comprise decoys.

17. The system according to claim 14, wherein said modified results comprise additional CPU cycles.

* * * * *